US012691617B2

(12) United States Patent
Miyakoshi et al.

(10) Patent No.: US 12,691,617 B2
(45) Date of Patent: Jul. 28, 2026

(54) INJECTION MOLD

(71) Applicant: HONDA MOTOR CO., LTD., Tokyo (JP)

(72) Inventors: Yukio Miyakoshi, Tokyo (JP); Tetsuro Hosaka, Tokyo (JP); Koshi Sato, Tokyo (JP); Takahiro Oi, Tokyo (JP); Yo Kobayashi, Tokyo (JP); Kazuhisa Fujiwara, Tokyo (JP); Hiroshi Otaguro, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 18/789,478

(22) Filed: Jul. 30, 2024

(65) Prior Publication Data

US 2025/0042073 A1      Feb. 6, 2025

(30) Foreign Application Priority Data

Jul. 31, 2023      (CN) .......................... 202310950438.5

(51) Int. Cl.
B29C 45/27          (2006.01)

(52) U.S. Cl.
CPC ................................ B29C 45/2708 (2013.01)

(58) Field of Classification Search
CPC .......... B60G 2206/81012; B29B 11/08; B29D 35/061; B29D 35/081; B29D 30/0678;

B29D 35/02; B23P 15/007; B29C 35/0009; B29C 33/308; B29C 2045/0094; B28B 1/24; B28B 21/38; B60B 2310/204; B63B 73/72
See application file for complete search history.

(56) References Cited

U.S. PATENT DOCUMENTS

| 6,235,230 B1 * | 5/2001 | Puniello | .............. B29C 45/2708 |
| | | | 425/577 |
| 2011/0130216 A1 * | 6/2011 | Kim | .................... B29C 45/2708 |
| | | | 473/378 |

FOREIGN PATENT DOCUMENTS

| JP | 07290515 A | * 11/1995 |
| JP | H07290515 A | 11/1995 |

* cited by examiner

*Primary Examiner* — Yung-Sheng M Tsui
(74) *Attorney, Agent, or Firm* — CKC & Partners Co., LLC

(57)          ABSTRACT

To provide an injection mold capable of molding a member with reduced weld marks. An injection mold 1 includes: a ring-shaped gate through which a molten resin is poured into a cavity disposed at a center; and a plurality of runners that supply the molten resin supplied from a sprue to the gate, and the gate includes a first ring that has a plurality of gate inlets, each of which communicates with one of the plurality of runners, a second ring that has a slit-shaped gate outlet extending in a circumferential direction and communicating with the cavity, the second ring being disposed inside the first ring and having a thickness thinner than the first ring, and a step that is disposed between the first ring and the second ring and establishes communication between the first ring and the second ring.

8 Claims, 7 Drawing Sheets

INJECTION MOLD

This application is based on and claims the benefit of priority from Chinese Patent Application No. CN202310950438.5, filed on 31 Jul. 2023, the content of which is incorporated herein by reference.

BACKGROUND OF THE INVENTION

Field of the Invention

The present invention relates to an injection mold.

Related Art

In an injection molding method, a molded article with a shape conforming to the shape of a cavity formed by clamping a mold is molded by filling the cavity with a material with fluidity such as a molten resin injected from an injector and cooling and solidifying the material with fluidity.

In the related art, a ring gate is used in a case in which a cylindrical member with a hollow inside is molded. The ring gate is adapted to fill the cavity at a center with the resin from an outer side, and in a case in which two sub-gates are used, for example, the resin is branched into two parts from gate outlets of the sub-gates and fills the cavity with an annular shape, and the resin flowing in from two opposing directions is merged and causes weld lines inside the cavity.

Thus, a ring gate mold that includes a ring gate and two sub-gates with the two sub-gates disposed in an eccentric state with respect to a center of the ring gate and in a state in which the two sub-gates have been rotated by 180 degrees with respect to the center of the ring gate as a reference point has been proposed (see Japanese Unexamined Patent Application, Publication No. H7-290515). According to the technology, a filling material ejected from the sub-gates is injected into the cavity while flowing in a spiral shape in the same direction inside the ring gate, the flows of the filling material ejected from the sub-gates are not merged, and weld marks are thus further unlikely to occur.

Patent Document 1: Japanese Unexamined Patent Application, Publication No. H7-290515

SUMMARY OF THE INVENTION

However, since timings at which the resin flows into the cavity are not the same in the technology in Japanese Unexamined Patent Application, Publication No. H7-290515, weld lines are likely to be caused by the filling resin being merged. Also, it is necessary to control flow paths to cause the flows to be merged in the spiral shape, and the mold has to have a complicated configuration.

An object of the present invention is to provide an injection mold capable of molding a member with reduced weld marks.

(1) An injection mold (an injection mold 1, which will be described later, for example) according to the present invention includes: a ring-shaped gate (a ring gate 5, which will be described later, for example) through which a molten resin (a molten resin M, which will be described later, for example) is poured into a cavity (a cavity C, which will be described later, for example) disposed at a center; and a plurality of runners (runners 3, which will be described later, for example) that supply the molten resin supplied from a sprue (a sprue 2, which will be described later, for example) to the gate, in which the gate includes a first ring (a first ring 51, which will be described later, for example) that has a plurality of gate inlets (gate inlets 53, which will be described later, for example), each of which communicates with one of the plurality of runners, a second ring (a second ring 52, which will be described later, for example) that has a slit-shaped gate outlet (a gate outlet 54, which will be described later, for example) extending in a circumferential direction and communicating with the cavity, the second ring being disposed inside the first ring and having a thickness thinner than the first ring, and a step (a step 55, for example) that is disposed between the first ring and the second ring and establishes communication between the first ring and the second ring.

The injection mold according to the present invention includes the sprue, the plurality of runners, and the ring gate through which the molten resin is poured into the cavity. The ring gate is configured of the first ring provided with the plurality of gate inlets, the second ring disposed inside the first ring and having the thickness thinner than the first ring, and the step that is disposed between the aforementioned two rings and establishes communication between the two rings. In this manner, the molten resin starting from the sprue and ejected from the plurality of gate inlets to the ring gate via the plurality of runners flows from the first ring into the second ring via the step, and it is thus possible to reliably cause the molten resin to be merged inside the ring gate. Furthermore, the ring gate includes the slit-shaped gate outlet extending in the circumferential direction and communicating with the cavity disposed at the center. In this manner, the molten resin reliably merged inside the ring gate can flow into the cavity at the same timing from the slit-shaped gate outlet, and it is thus possible to mold a member with reduced weld marks.

(2) The injection mold according to (1) above, in which the gate outlet is a slit continuous in the circumferential direction.

In this configuration, the gate outlet provided in the second ring has the slit shape continuous in the circumferential direction. In this manner, the molten resin is more likely to flow into the cavity disposed at the center of the second ring at the same timing, and it is possible to enhance an effect of molding a member with reduced weld marks.

(3) The injection mold according to (2) above, in which the plurality of gate inlets are evenly disposed in the circumferential direction of the first ring.

In this configuration, the plurality of gate inlets are evenly disposed in the circumferential direction of the first ring. In this manner, the molten resin evenly flows from the plurality of gate inlets into the ring gate, and the molten resin can be further reliably merged inside the ring gate.

(4) The injection mold according to (3) above, in which the number of the plurality of gate inlets provided is an even number, and the injection mold further includes sub-gates, each of which establishes communication between two adjacent gate inlets of the plurality of gate inlets and communicates with the runners.

In this configuration, the two gate inlets are coupled with each sub-gate communicating with each runner. In this manner, it is possible to increase the number of gate inlets provided in the circumferential direction of the first ring and to cause the molten resin to be reliably merged by evenly increasing the flows of the molten resin ejected to the ring gate.

(5) The injection mold according to any one of (1) to (4) above, the cavity has a cylindrical shape, and the gate is provided at substantially a center of the cavity in an axial center direction.

In this configuration, the cavity formed by the mold has a cylindrical shape, and the ring gate is provided at substantially the center of the cavity in the axial center direction. In this manner, the cavity is uniformly filled with the molten resin vertically branched with respect to the axial center direction of the cavity from the gate outlet provided at substantially the center of the cavity in the axial center direction, and it is thus possible to mold a cylindrical member with reduced weld marks.

According to the present invention, it is possible to mold a member with reduced weld marks by filling the cavity with the molten resin merged inside the gate at the same timing.

DETAILED DESCRIPTION OF THE INVENTION

Hereinafter, a configuration of an injection mold 1 according to an embodiment of the present invention will be described in detail with reference to the drawings. Note that the same timing stated in the context of a molten resin M flowing into a cavity C at the same timing represents substantially the same timing rather than the same time in a strict sense, and description will be given on the assumption that a period of time in which the molten resin M flows into the cavity C has a width.

Figure 1:
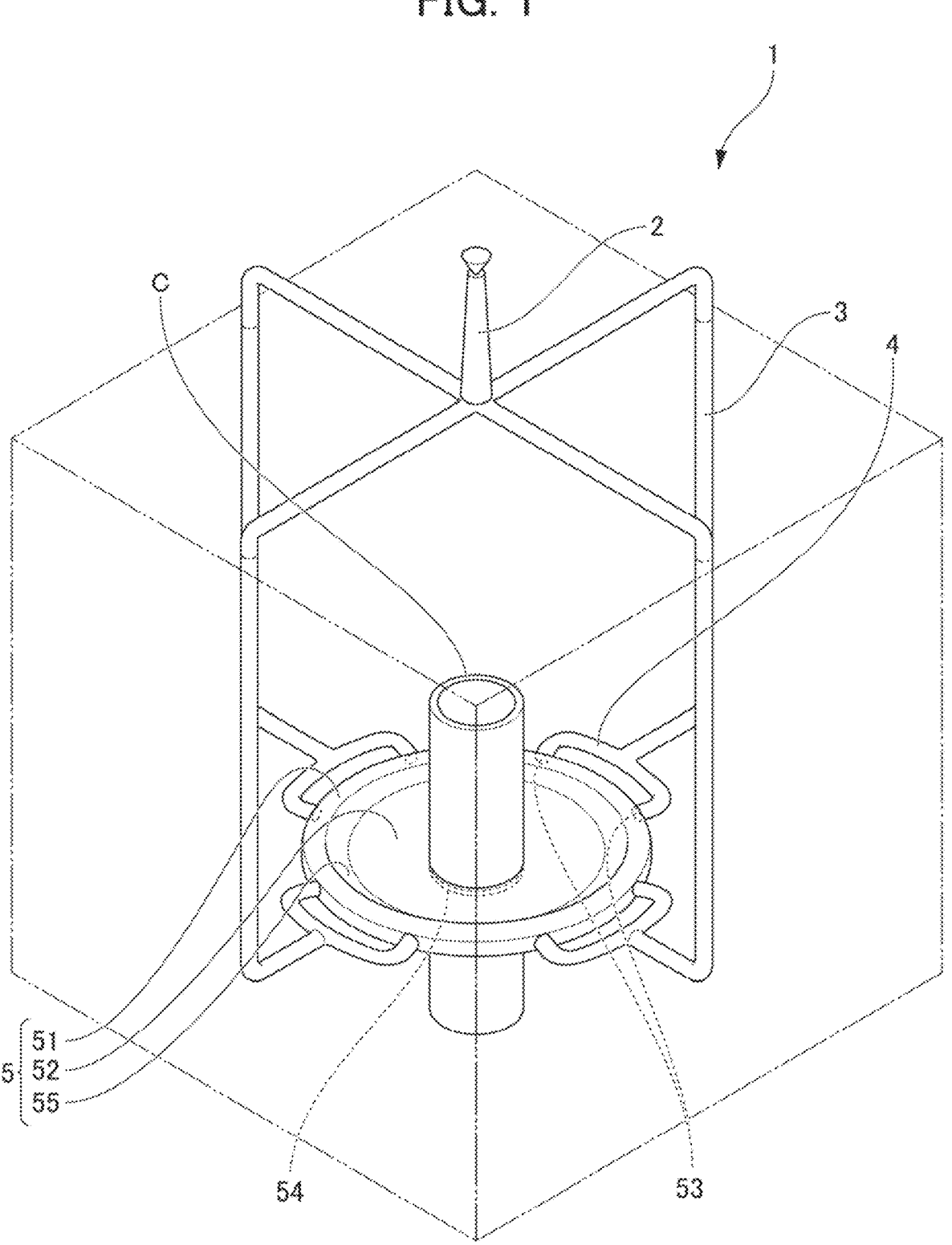
FIG. 1 is a perspective view illustrating an exterior configuration of an injection mold according to an embodiment.

FIG. 1 is a perspective view illustrating an exterior configuration of the injection mold 1 according to the present embodiment. Note that in FIG. 1, the outer shape of the injection mold 1 is illustrated by the two-dotted dashed line with a split structure omitted. The outer shape of the mold is not limited to a cubic shape, and an inner structure of the clamped injection mold 1 is represented.

Figure 2:
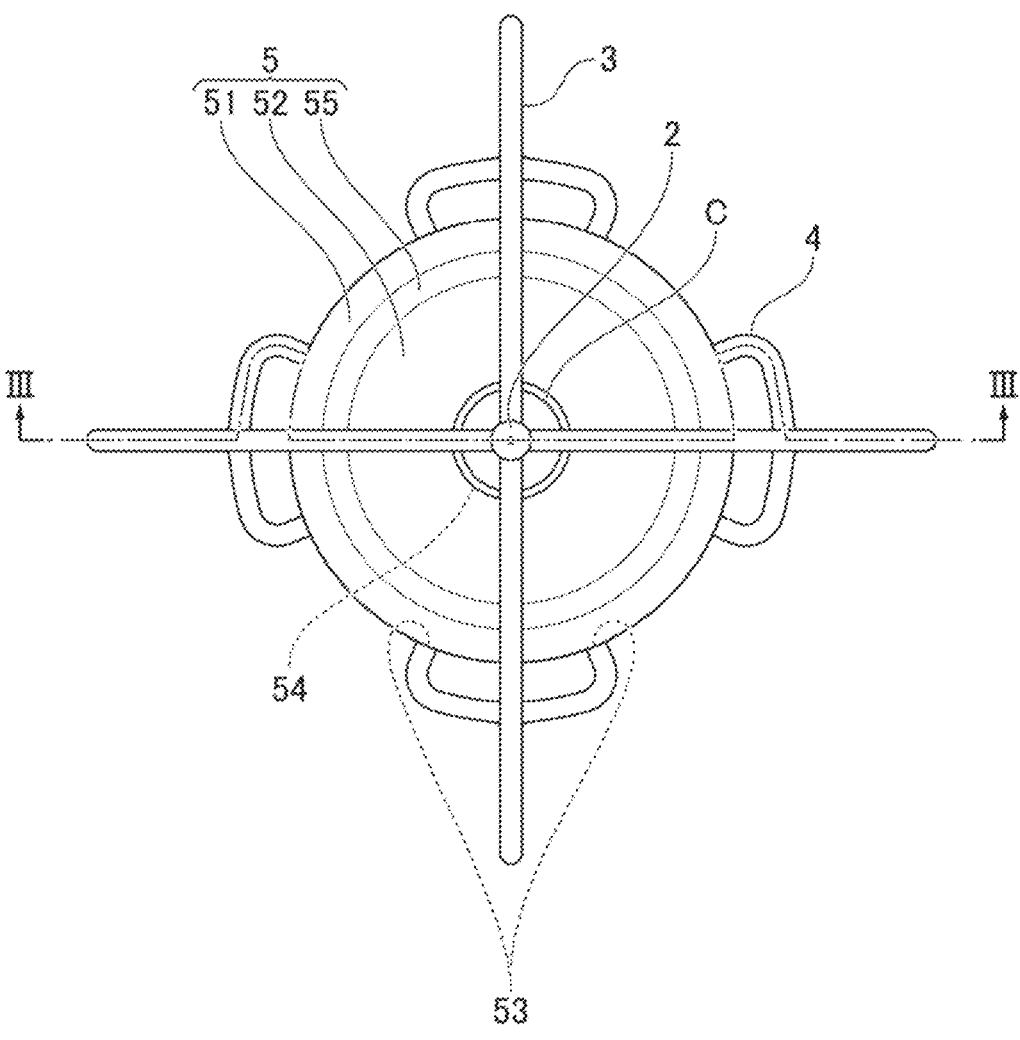
FIG. 2 is a plan view of FIG. 1.

FIG. 2 is a diagram of the injection mold 1 illustrated in FIG. 1 in a plan view. Note that the outer shape of the injection mold 1 is omitted in FIG. 2.

Figure 3:
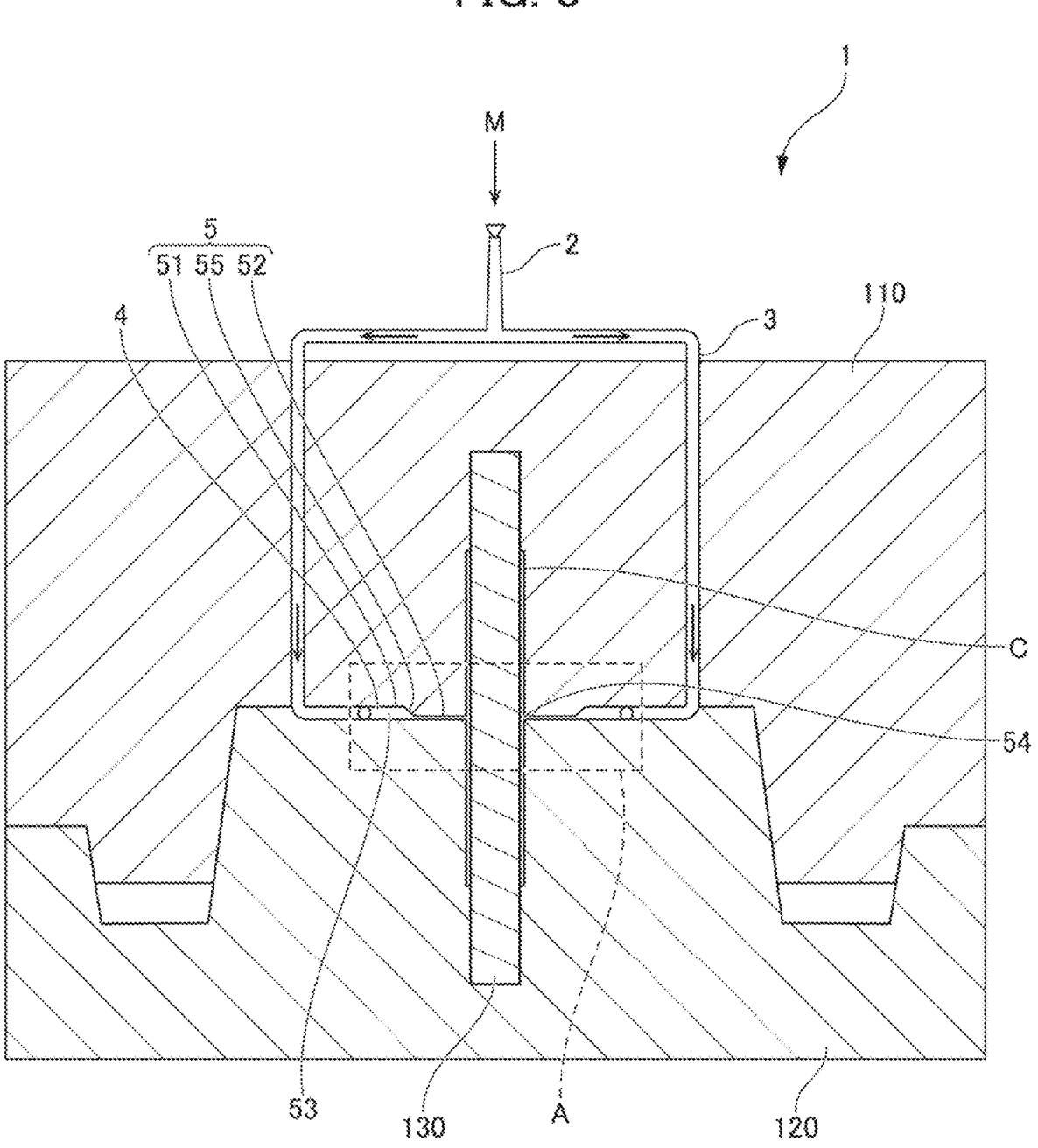
FIG. 3 is a sectional view along the line III-III in FIG. 2.

FIG. 3 is a sectional view along the line III-III illustrated in the plan view of the injection mold 1 in FIG. 2. In order to illustrate flow paths of sub-gates 4 as well, the cut line illustrated in FIG. 2 is not a straight line and is curved along the sub-gates 4. The arrows in the drawing illustrate flows of the molten resin M injected into a sprue 2 and filling the cavity C.

As illustrated in FIG. 3, the injection mold 1 includes a fixed mold 110, a movable mold 120, and a core 130. The fixed mold 110 is fixed at an upper portion and is clamped with the movable mold 120 capable of moving forward and backward at the time of filling with the molten resin M. The inner shape of the injection mold 1 clamped with the core 130 disposed between the fixed mold 110 and the movable mold 120 corresponds to the shape of the cavity C, and it is possible to mold a cylindrical member with a through-hole.

The fixed mold 110 includes the sprue 2 and runners 3. Sub-gates 4 communicating with the runner 3 and a ring gate 5 are formed between the clamped fixed mold 110 and movable mold 120.

The sprue 2 is a mold flow path through which the molten resin M injected from an injector flows at first, and is provided outside the fixed mold 110. As illustrated in FIG. 1, an uppermost portion of the sprue 2 serves as a liquid inlet with a funnel shape to pour the molten resin M. The flow path of the sprue 2 has a tapered shape with a diameter increasing from an upper end to a lower end.

The runners 3 are tubular mold flow paths with distal ends communicating with the sprue 2. Returning to FIG. 3, upper portions of the runners 3 are provided outside the fixed mold 110. Returning to FIG. 2, the runners 3 are radially branched into four parts with an axial center of a lower end portion of the sprue 2 in a plan view located at the center. Returning to FIG. 1, one runner 3 has a substantially U shape in a side view, the shapes of the four runners 3 are the same, and the runners 3 are evenly disposed in a circumferential direction of the sprue 2. Each of ends of the runners 3 communicates with each sub-gate 4.

As illustrated in FIGS. 1 and 2, each sub-gate 4 is branched into two parts in a horizontal direction from the end of each runner 3, ends of two tubular flow paths communicate with the ring gate 5, and the sub-gate 4 thus has a substantially U shape in a plan view. The ends of the two branched flow paths communicate with gate inlets 53 provided in the ring gate 5.

The ring gate 5 includes a first ring 51, a second ring 52, and a step 55. Returning to FIG. 2, the ring gate 5 has a disc shape. The first ring 51 has the aforementioned gate inlets 53 in the circumferential direction and communicates with the ends of the two branched flow paths of each of the four sub-gates 4. In other words, the ring gate 5 has eight gate inlets 53 evenly disposed in the circumferential direction on an outer circumferential side. Returning to FIG. 3, the thickness of the first ring 51 and the height of the tubular flow paths of the sub-gates 4 are the same.

The second ring 52 is disposed on the inner circumferential side of the first ring 51. The second ring 52 has a gate outlet 54 communicating with the cavity C, and the thickness of the gate is thinner than that of the first ring 51. A slope inclined in an obliquely downward direction from the first ring 51 to the second ring 52 forms the step 55.

The gate outlet 54 establishes communication between the second ring 52 and the cavity C and has a slit shape that continues in the circumferential direction of the cavity C. The thicknesses of the gate outlet 54 and the second ring 52 are the same and are thinner than the thickness of the first ring 51 as described above. The ring gate 5 is provided at substantially the center of the cavity C in an axial center direction.

The cavity C is a cylindrical hollow with a constant height that is molded when the fixed mold 110 and the movable mold 120 are clamped. The cavity C has a hollow shape for molding a cylindrical member with a through-hole by disposing the core 130 that is longer than the cavity C in the axial center direction at the center of the cavity C.

Next, a method of filling the injection mold 1 with the molten resin M injected from an injector and molding a member with reduced weld marks will be described in detail with reference to the drawings.

As illustrated by the arrows in FIG. 3, the liquid inlet with the funnel shape provided at the upper end of the sprue 2 is filled with the molten resin M. The molten resin M passes through the runners 3 branched in the four directions and reaches each of the four sub-gates 4. The molten resin M is further branched into two flow paths at each sub-gate 4 and evenly flows into the ring gate 5 from the eight gate inlets 53.

Figure 4:
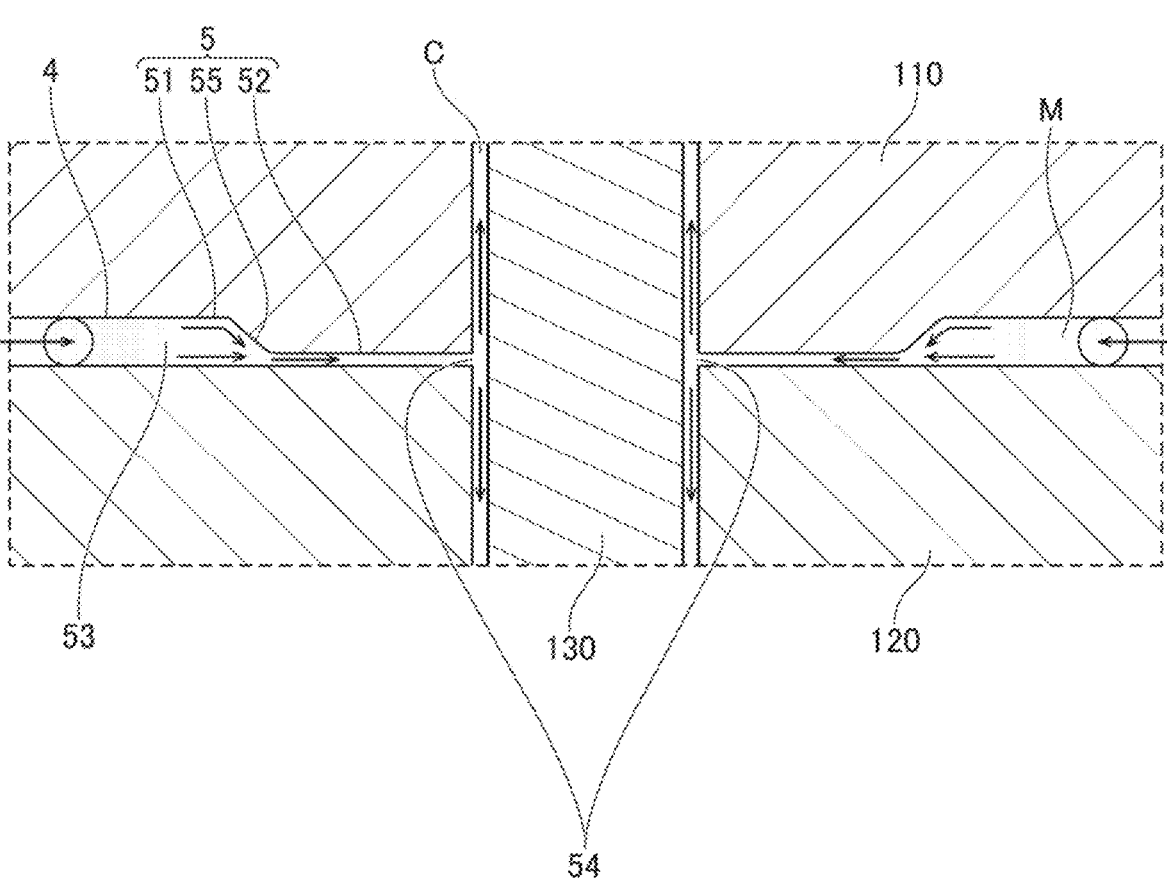
FIG. 4 is an enlarged view of the part surrounded by the broken line in FIG. 3.

FIG. 4 is an enlarged vertical sectional view of FIG. 3 illustrating how the molten resin M that has flowed in from the gate inlets 53 of the ring gate 5 flows from the first ring 51 into the second ring 52 and then fills the cavity C from the gate outlet 54. The arrows in the drawing illustrate directions in which the molten resin M flows.

Figure 5A:
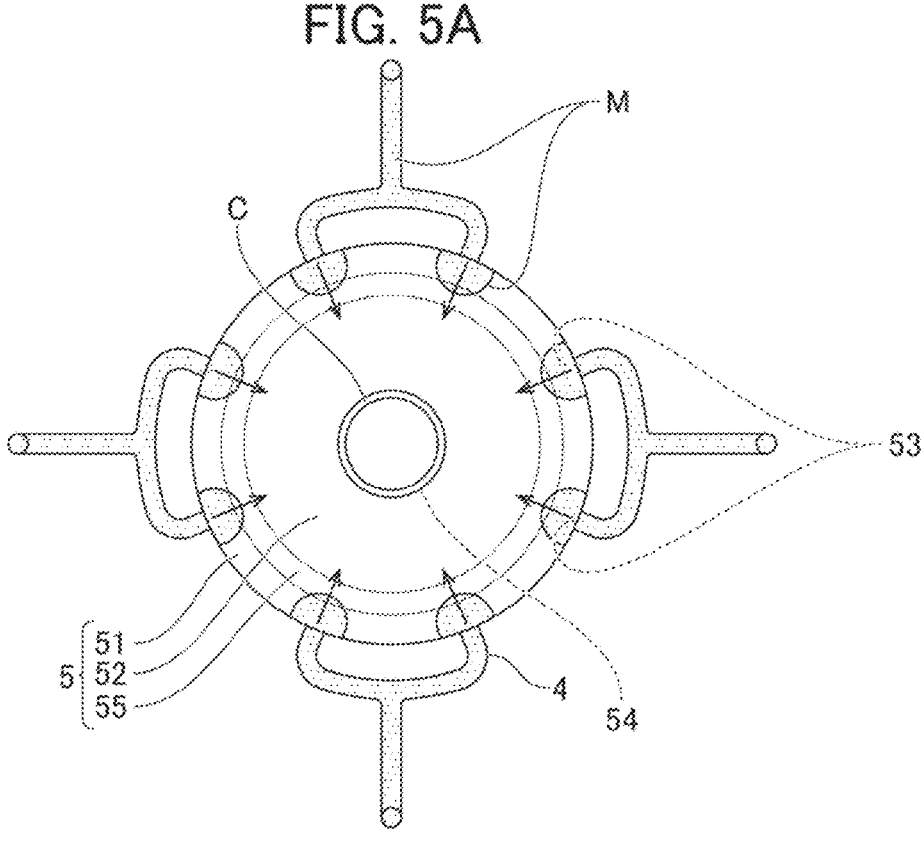
FIG. 5A is a diagram illustrating a state in which a molten resin has been ejected from a gate inlet to a first ring.

FIGS. 5A to 5D are plan views schematically illustrating how the molten resin M is reliably merged inside the ring gate 5. Firstly, FIG. 5A illustrates how the molten resin M ejected into the ring gate 5 finally fills the inside of the cavity C disposed at the center in FIG. 5D. The arrows in the drawing illustrate directions in which the molten resin M flows. Note that in FIGS. 5A to 5D, the outer shape of the injection mold 1 is omitted.

As illustrated in FIGS. 4 and 5A, the molten resin M that has passed through the sub-gates 4 is ejected from the eight gate inlets 53 evenly provided in the outer circumferential direction of the ring gate 5 to the ring gate 5. The molten resin M evenly flows into the first ring 51 communicating with the gate inlets 53 and spreads in the direction of the cavity C disposed at the center. As illustrated in FIG. 5A, the molten resin M has not yet been merged inside the ring gate 5.

Figure 5B:
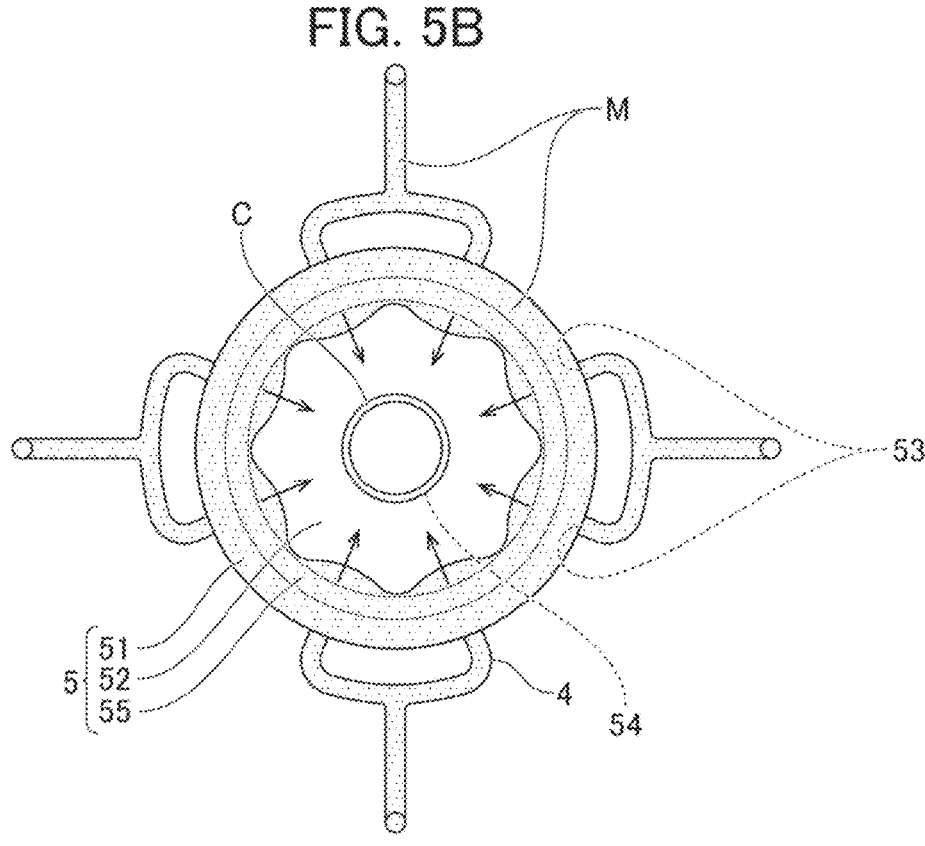
FIG. 5B is a diagram illustrating how the molten resin flows into a second ring.

Next, the molten resin M flows from the first ring 51 into the second ring 52 via the step 55 with the inclined surface, as illustrated in FIGS. 4 and 5B. Since the thickness of the second ring 52 is thinner than that of the first ring 51, the flowing pressure and the amount of flow of the molten resin M from the gate inlets 53 are reduced before the second ring 52. Therefore, the molten resin M is reliably merged via the step 55 by a specific amount of molten resin M staying at the step 55 establishing communication between the first ring 51 and the second ring 52. Here, the molten resin M that has completely been merged flows from the step 55 into the second ring 52 and flows so as to concentrate in the direction of the cavity C disposed at the center.

Figure 5C:
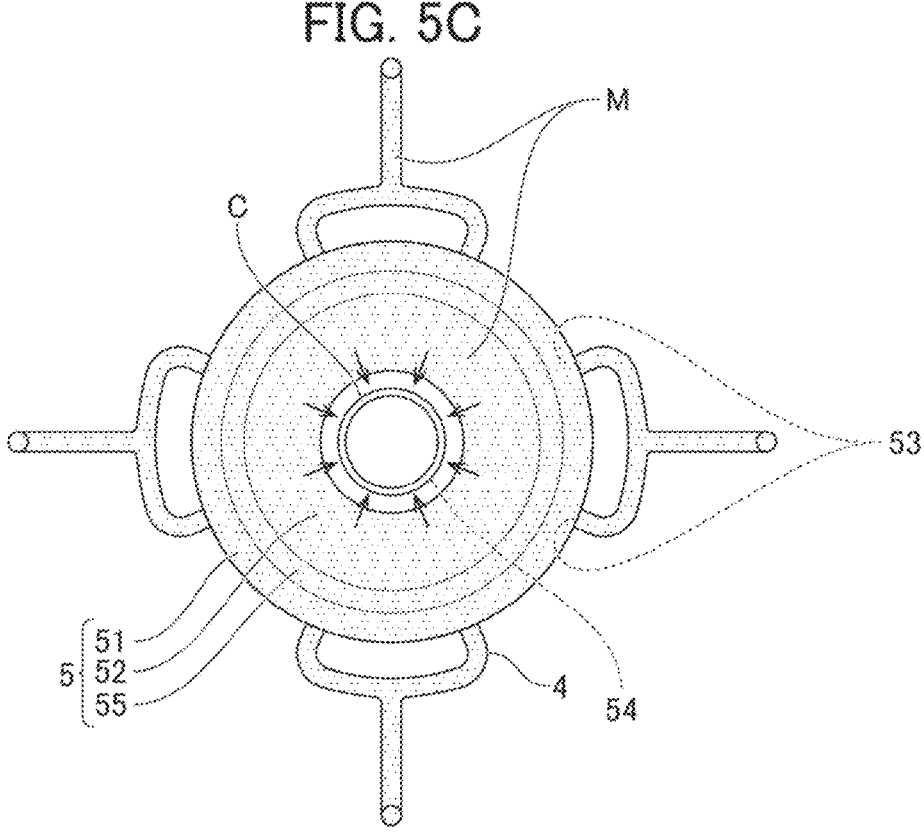
FIG. 5C is a diagram illustrating how the molten resin flows into a gate outlet from the second ring.

Next, the molten resin M that has reached the second ring 52 flows in the direction of the gate outlet 54 communicating with the cavity C while maintaining an even flow in the circumferential direction of the ring gate 5 as illustrated in FIGS. 4 and 5C. As described above, the molten resin M sequentially ejected from the gate inlets 53 is gradually accumulated at the step 55 as described above, and a pressure of the retained resin pushes the molten resin M from the step 55 to the second ring 52 without interruption. Therefore, the molten resin M flowing inside the second ring 52 spreads with a flowing pressure to the cavity C disposed at the center without causing any gap or the like while keeping the completely merged state via the step 55.

Figure 5D:
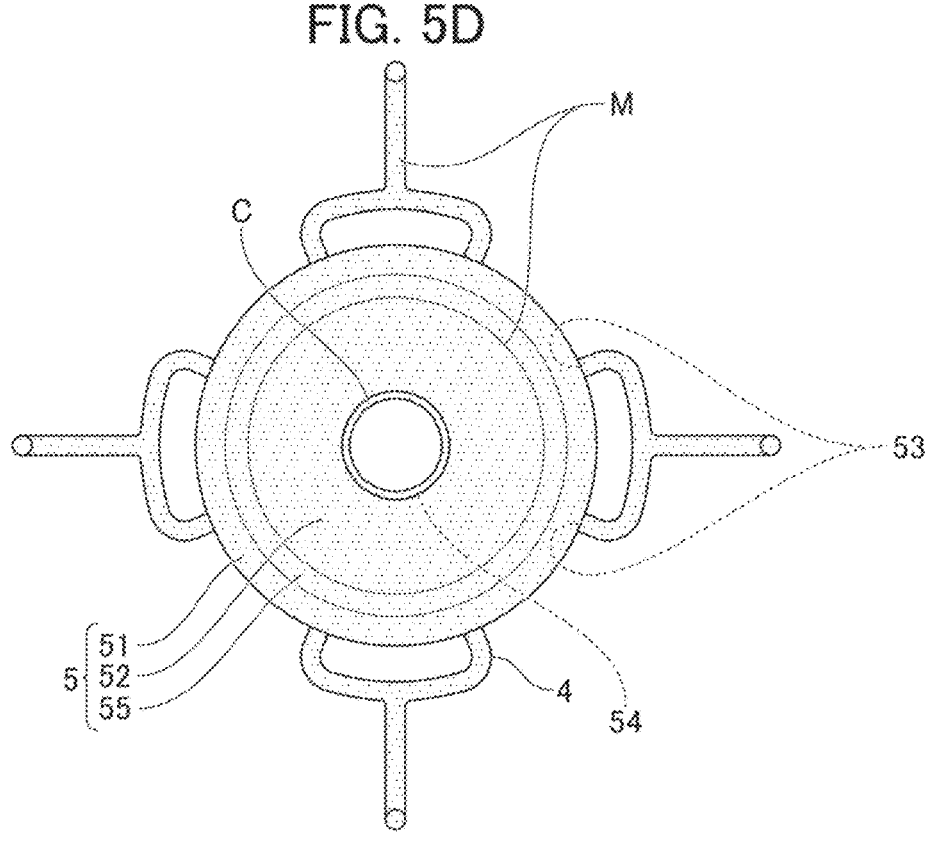
FIG. 5D is a diagram illustrating how a cavity has been filled with the molten resin.

Next, the molten resin M that has moved forward in the completely merged state and has uniformly reached the gate outlet 54 without any time difference passes through the gate outlet 54 and flows into the cavity C as a hollow disposed at the center of the ring gate 5 as illustrated in FIGS. 4 and 5D. The gate outlet 54 is provided at substantially the center of the cavity C in the axial center direction and has a slit shape continuous in the circumferential direction of the cavity C, and the height of the gate is the same as the thickness of the second ring 52. Therefore, the flow of the molten resin M that has completely been merged at the ring gate 5 is not interrupted, and the flowing pressure is also not offset, by passing through the gate outlet 54 from the second ring 52. With this configuration, the inside of the cavity C is uniformly filled with the molten resin M at the same timing from the circumferential direction of the ring gate 5.

As illustrated in FIG. 4, the flow of the molten resin M that has flowed from substantially the center of the cavity C in the axial center direction into the cavity C is branched at an equal speed in the up-down direction while filling the circumferential direction and completely fills the cavity as the hollow. Since the flows of the molten resin M filling the inside of the cavity C while being branched in the up-down direction do not confront each other, opportunities in which weld marks are generated due to merging of the resin inside the cavity C are reduced.

After the filling with the molten resin M followed by cooling and solidification of the molten resin M, the movable mold 120 is then moved and opened from the fixed mold 110. The core 130 appears outside through the mold opening to be easily pulled out, and a cylindrical member with a through-hole and with reduced weld marks can be formed.

According to the present embodiment, the following advantages are achieved.

The injection mold 1 according to the present embodiment includes: the ring gate 5 through which the molten resin M is poured into the cavity C disposed at the center; and the four runners 3 that supply the molten resin M supplied from the sprue 2 to the ring gate 5, and the ring gate 5 includes the first ring 51 that include the eight gate inlets 53, each of which communicates with one of the four runners 3, the second ring 52 that includes the slit-shaped gate outlet 53 extending in the circumferential direction and communicating with the cavity C, the second ring 52 being disposed inside the first ring 51 and having the thickness thinner than the first ring 51, and the step 55 that is disposed between the first ring 51 and the second ring 52 and establishes communication between the first ring 51 and the second ring 52.

Figure 6:
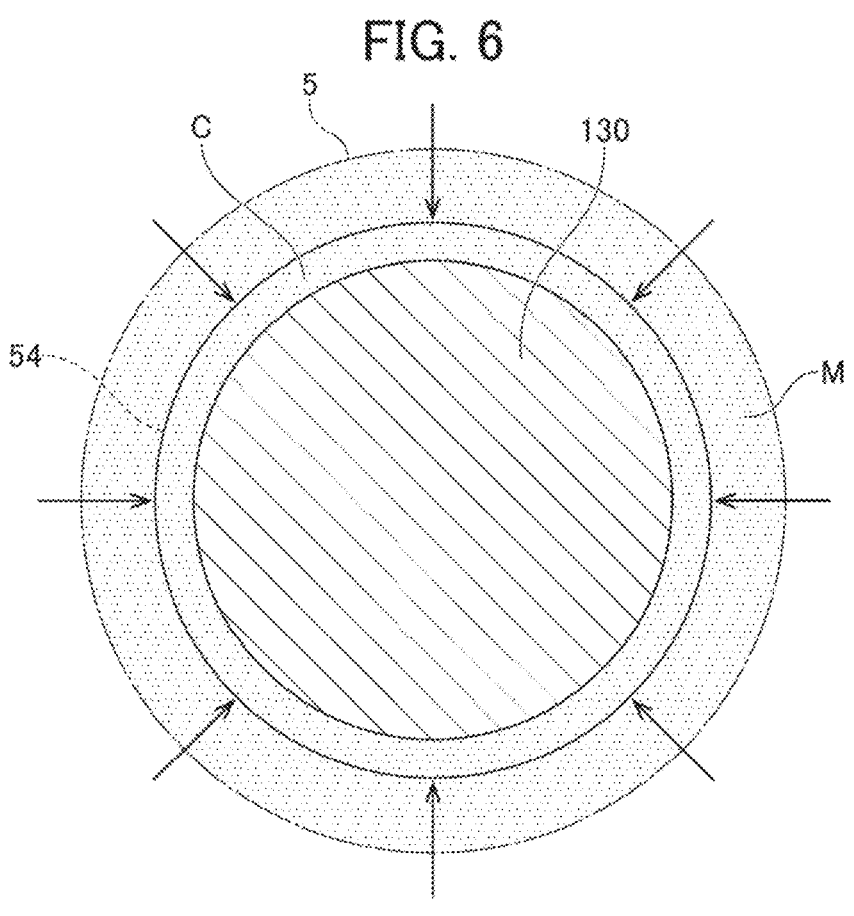
FIG. 6 is a diagram illustrating how the resin flows into the cavity according to the present embodiment.

In this manner, the molten resin M starting from the sprue 2 and ejected from the eight gate inlets 53 to the ring gate 5 via the four runners 3 flows from the first ring 51 into the second ring 52 via the step 55, and it is thus possible to cause the molten resin M to be reliably merged inside the ring gate 5. Furthermore, the ring gate 5 includes the slit-shaped gate outlet 54 extending in the circumferential direction and communicating with the cavity C disposed at the center. In this manner, the molten resin M reliably merged inside the ring gate 5 can uniformly flow from the slit-shaped gate outlet 54 into the cavity C at the same timing, and it is thus possible to mold a member with reduced weld marks. FIG. 6 is a schematic plan view illustrating how the cylindrical cavity C is filled with the molten resin M in the present invention. Note that in FIG. 6, the outline of the ring gate 5 is omitted in the middle. The arrows in the drawing illustrate directions in which the molten resin M flows.

Figure 7:
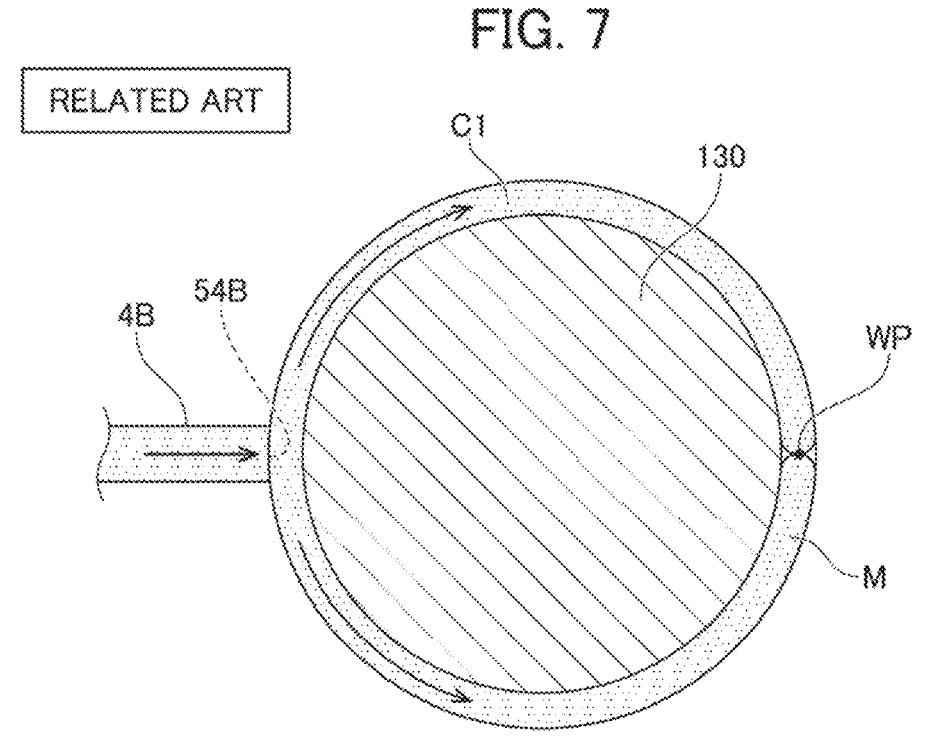
FIG. 7 is a diagram illustrating how a resin flows into cavity according to the related art.

FIG. 7 is a schematic plan view illustrating how a cylindrical cavity C1 is filled with a molten resin M in the related art. The arrows in the drawing illustrate directions in which the molten resin M flows.

In the related art, the molten resin M is branched into two parts and flows into the cavity C1 when the molten resin M is ejected from a gate outlet 54B provided at a sub-gate 4B into the cavity C1, and a weld line is generated at a point WP at which the two flows of the molten resin M are merged while confronting each other.

On the other hand, according to the present invention, the molten resin M passes through the slit-shaped gate outlet 54 continuous in the circumferential direction and uniformly fills the inside of the cavity C in the circumferential direction of the ring gate 5 at the same timing as described above, there are thus no opportunities for the flows of the molten resin M to be merged while confronting each other inside the cavity C, and opportunities in which weld lines are generated are reduced.

Also, the gate outlet 54 according to the present embodiment is a slit continuous in the circumferential direction.

In this manner, the molten resin M is further likely to flow into the cavity C disposed at the center of the ring gate 5 at the same timing, and it is possible to enhance the effect of molding a member with reduced weld marks. Also, it is possible to uniformize a composition of the resin that has flowed into the cavity since the flowing of the molten resin M into the cavity C at the same timing is further facilitated, and it is possible not only to achieve an effect of reducing weld marks in the exterior shape but also to mold a molded article with excellent mechanical properties, such as a tensile strength, tensile elongation, a bending strength, and an impact resistance, for example.

Also, the eight gate inlets 53 according to the present embodiment are evenly disposed in the circumferential direction of the first ring 51.

In this manner, the molten resin M evenly flows into the ring gate 5 from the eight gate inlets 53, and it is possible to cause the molten resin M to be further reliably merged inside the ring gate 5.

Also, the number of gate inlets 53 provided according to the present embodiment is eight, which is an even number, and the four sub-gates, each of which couples two adjacent gate inlets 53 and communicates with the four runners 3, are further included.

In this manner, it is possible to increase the number of gate inlets 53 to be provided in the outer circumferential direction of the first ring 51, to further uniformize the flows of the molten resin M ejected into the ring gate 5 by evenly increasing the flows of the molten resin ejected to the ring gate 5, and to cause the flows to be reliably merged.

Also, the cavity C according to the present embodiment has a cylindrical shape, and the ring gate 5 is provided at substantially the center of the cavity C in the axial center direction.

In this manner, the cavity C is uniformly filled with the molten resin M vertically branched with respect to the axial center direction of the cavity C from the gate outlet 54 of the ring gate 5 provided at substantially the center of the cavity C in the axial center direction, and it is possible to mold a cylindrical member with reduced weld marks.

Note that although the gate outlet 54 has one slit shape continuous in the circumferential direction in the present embodiment, the present invention is not limited thereto, and a plurality of slit-shaped gate outlets may be provided in the circumferential direction. In the case in which the plurality of slit-shaped gate outlets are provided in the circumferential direction, it is possible to achieve similar advantages by setting the shapes of the gate outlets and the number of provided gate outlets such that the molten resin M that has flowed from the gate outlets into the cavity C can be reliably merged inside the cavity before reaching the core 130.

Also, although the four sub-gates 4 are made to communicate with the four runners 3 in the present embodiment, the present invention is not limited to this configuration. The number of runners is not limited, and the disposition and the shape are also not limited. Also, a configuration in which the sub-gates are not provided and the runners communicate with the ring gate can also be employed, and a free design can be employed in accordance with a mold.

Moreover, although the ring gate 5 is provided at substantially the center of the cavity C in the axial center direction in the present embodiment, the present invention is not limited thereto. The ring gate 5 can be provided at a free position with respect to the axial center direction of the cavity C.

Preferred embodiments of the present invention have been described above. However, the present invention is not limited to the above embodiments, and modifications can be appropriately made within the scope of the gist of the present invention.

EXPLANATION OF REFERENCE NUMERALS

C Cavity
1 Injection mold
2 Sprue
3 Runner
5 Ring gate (ring-shaped gate)
51 First ring
52 Second ring
53 Gate inlet
54 Gate outlet
55 Step

What is claimed is:

1. An injection mold comprising:
a ring-shaped gate through which a molten resin is poured into a cavity disposed at a center; and
a plurality of runners that supply the molten resin supplied from a sprue to the gate;
wherein the gate includes
a first ring that has a plurality of gate inlets, each of which communicates with one of the plurality of runners,
a second ring that has a slit-shaped gate outlet extending in a circumferential direction and communicating with the cavity, the second ring being disposed inside the first ring and having a thickness thinner than the first ring, and
a single step comprising an inclined slope, disposed between the first ring and the second ring to establish communication between the first ring and the second ring.

2. The injection mold according to claim 1, wherein the gate outlet is a slit continuous in the circumferential direction.

3. The injection mold according to claim 2, wherein the plurality of gate inlets are evenly disposed in the circumferential direction of the first ring.

4. The injection mold according to claim 3,
wherein a number of the plurality of gate inlets provided is an even number, and
the injection mold further includes sub-gates, each of which establishes communication between two adjacent gate inlets of the plurality of gate inlets and communicates with the runners.

5. The injection mold according to claims 1,
wherein the cavity has a cylindrical shape, and
the gate is provided at substantially a center of the cavity
   in an axial center direction.

6. The injection mold according to claims 2,
wherein the cavity has a cylindrical shape, and
the gate is provided at substantially a center of the cavity
   in an axial center direction.

7. The injection mold according to claims 3,
wherein the cavity has a cylindrical shape, and
the gate is provided at substantially a center of the cavity
   in an axial center direction.

8. The injection mold according to claims 4,
wherein the cavity has a cylindrical shape, and
the gate is provided at substantially a center of the cavity
   in an axial center direction.

* * * * *